United States Patent [19]

Bayat

[11] Patent Number: 4,708,162

[45] Date of Patent: Nov. 24, 1987

[54] SPRINKLER CONTROL SYSTEM

[76] Inventor: John J. Bayat, 3501 Cashill Blvd., Reno, Nev. 89509

[21] Appl. No.: 849,470

[22] Filed: Apr. 8, 1986

[51] Int. Cl.$^4$ ............................................. A01G 27/00
[52] U.S. Cl. .................... 137/382; 137/624.18; 239/70
[58] Field of Search ............... 137/624.2, 624.18, 883, 137/343, 382, 377; 239/70, 69

[56] References Cited

U.S. PATENT DOCUMENTS

| | | | |
|---|---|---|---|
| 2,637,469 | 5/1953 | Clay | 137/624.18 X |
| 3,286,733 | 11/1966 | Hunter | 137/624.2 |
| 3,386,460 | 6/1968 | Dean | 137/624.18 X |
| 4,548,225 | 10/1985 | Busalacchi | 239/69 X |

*Primary Examiner*—Alan Cohan
*Attorney, Agent, or Firm*—Flehr, Hohback, Test, Albritton & Herbert

[57] ABSTRACT

Self-contained, automated flow control system for use in a water distribution system such as a sprinkler system. The system has a master valve which controls communication between a supply line and a manifold, and a plurality of control valves which control communication between the manifold and a plurality of outlet lines. An anti-siphon valve is connected between the master valve and the control valves to prevent water from being drawn back into the supply line from the outlet lines. Operation of the master valve and control valves is controlled by a clock timer which is programmed to actuate the valves in a predetermined sequence and to open the master valve only when one of the control valves is open.

2 Claims, 2 Drawing Figures

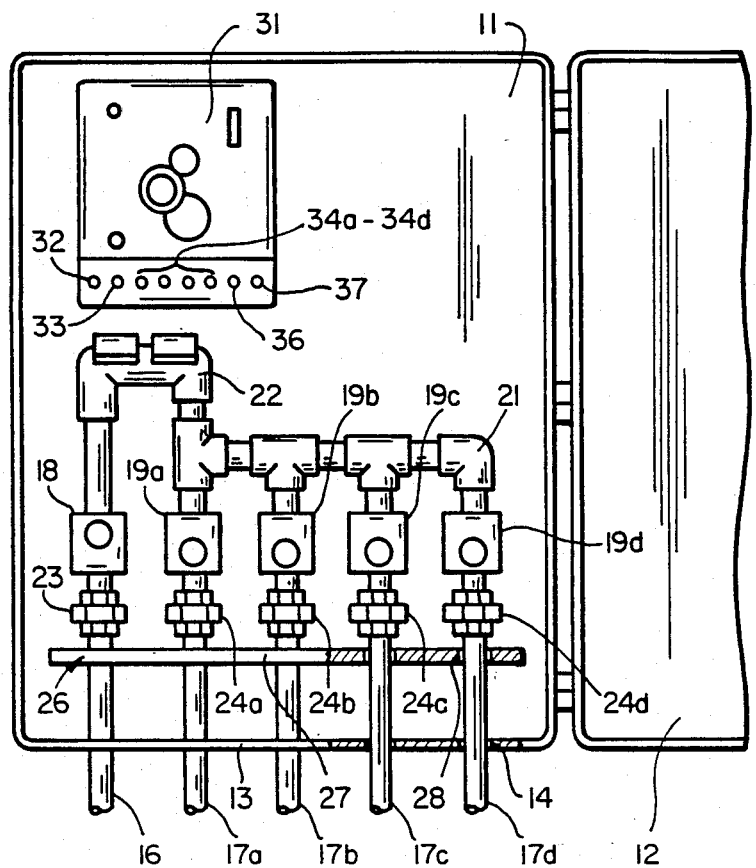
FIG_1
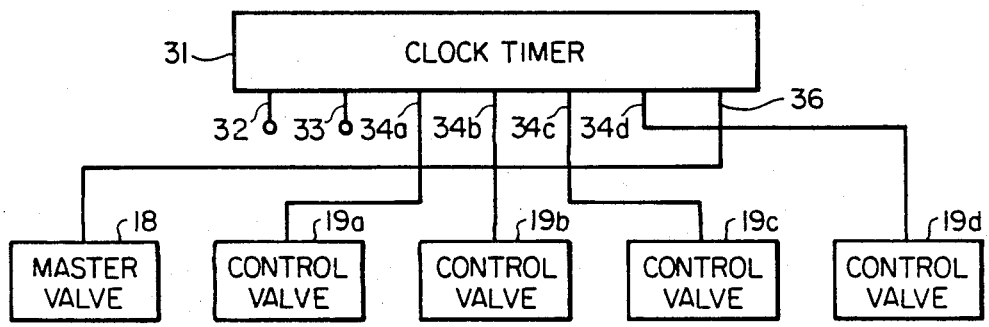
FIG_2

SPRINKLER CONTROL SYSTEM

This invention pertains generally to a water distribution systems such as sprinkler systems, and more particularly to an automated flow control system which is particularly suitable for use in a sprinkler system.

It is in general an object of the invention to provide a new and improved automated control system for sprinklers and other water distribution systems.

Another object of the invention is to provide a system of the above character which is economical to manufacture and easy to install and maintain.

These and other objects are achieved in accordance with the invention by providing a flow control system having a manifold, a master valve which controls communication between a supply line and the manifold, a plurality of control valves which control communication between the manifold and a plurality of outlet lines, an anti-siphon valve between the control valves and the master valve, and a clock timer for actuating the valves in a predetermined manner. The manner in which the valves are actuated is such that the master valve is open only when one of the control valves is open, and the pressure is removed from the anti-siphon valve when all of the control valves are closed. This system is constructed as a self-contained unit in a protective cabinet, and union connectors permit the supply and outlet lines to be readily connected to and disconnected from the unit.

FIG. 1 is a somewhat schematic front elevational view, partly broken away, of one embodiment of a flow control system according to the invention.

FIG. 2 is a circuit diagram of the flow control system of FIG. 1.

As illustrated in FIG. 1, the flow control system includes a generally rectangular cabinet 11 having a hingedly mounted front cover 12. The bottom wall 13 of the cabinet has a plurality of circular openings 14 through which a supply line 16 and a plurality of outlet lines 17a–17d extend. Although a single supply line and four outlet lines are shown in this particular example, any desired number of lines can be employed, and the cabinet can be sized accordingly.

Within the cabinet, a master valve 18 and control valves 19a–19d control flow between the supply lines and the outlet lines. The master valve is connected between the supply line and the inlet port of a manifold 21, and the control valves are connected between the outlet ports of the manifold and the outlet lines. Each of these valves is an electrically actuated, normally closed, solenoid operated valve. An anti-siphon valve 22 is connected between the main valve and the inlet port of the manifold to prevent backflow from the outlet lines to the supply line.

The manifold can be constructed in any suitable manner, and in one presently preferred embodiment it is fabricated of rigid plastic pipe and fittings, e.g. polyvinyl chloride (PVC) pipe and fittings.

Connections between the supply line and the master valve and between the outlet lines and the control valves are made with union fittings 23 and 24a–24d, respectively. These fittings permit the valves and manifold to be readily installed and removed without rotating or otherwise disturbing the supply and outlet lines.

The manifold and valves are secured in the cabinet by a mounting rack 26 which extends horizontally across the cabinet above bottom wall 13 and below unions 23 and 24a–24d. The rack comprises a bar 27 of rigid material which is affixed to the rear wall of the cabinet and has spaced apart openings 28 through which the supply and outlet lines extend. These openings are of smaller diameter than the unions, and the portions of the unions connected to the supply and outlet lines engage the rack to hold the lines when the manifold and valves are disconnected. The rack also permits limited up and down movement of the lines as they are connected and disconnected.

Operation of valves 18 and 19a–19d is controlled by a programmable clock timer 31 which is mounted in cabinet 11. This timer is of conventional design, and it has input terminals 32, 33 for connection to a power source, output terminals 34–34d and 36, and a common or ground terminal 37. Terminals 34–34d are energized sequentially in accordance with the programming of the timer, and terminal 36 is energized whenever one of the other output terminals is energized. Terminals 34a–34d are connected to control valves 19a–19d, respectively, and terminal 36 is connected to master valve 18. The master valve is energized or opened only when one of the control valves is open, and pressure is removed from the anti-siphon valve 22 when all of the control valves are closed.

Operation and use of the flow control system in connection with a sprinkler system is as follows. The control system is mounted in a suitable location such as the outside wall of a house or other building. Supply line 16 is connected to a pressurized water source, and outlet lines 17a–17d are connected to the feeders for the different sections of the sprinkler system. Input terminals 32, 33 of clock timer 31 are connected to a power source, and the timer is programmed to energize or open control valves 19a–19d in a predetermined sequence. Whenever one of the control valves is opened, the master valve is also opened, and water is delivered to the sprinkler section connected to that valve. Anti-siphon valve 22 prevents water from being drawn back into the supply line from the outlet lines, and pressure is removed from the anti-siphon valve when all of the control valves are closed.

The supply and outlet lines can be any suitable material, such as a plastic pipe or garden hose, and they can be provided with fittings for connection to other lines. Thus, for example, the supply line might be a pipe which is connected permanently to the water supply system, and the outlet lines might comprise pipe nipples with male hose fittings positioned outside the cabinet for connection to a plurality of hoses. Alternatively, the outlet lines might be pipes connected permanently to a sprinkler system. Any desired combination of hoses and pipes or other lines is possible.

The invention has a number of important features and advantages. It is constructed as a self-contained unit which is economical to manufacture and easy to install and maintain. It can be employed in a wide variety of applications.

It is apparent from the foregoing that a new and improved flow control system has been provided. While only one presently preferred embodiment has been described in detail, as will be apparent to those familiar with the art, certain changes and modifications can be made without departing from the scope of the invention as defined by the following claims.

I claim:

1. In a system for controlling the flow of water from a supply line to a plurality of outlet lines: a generally rectangular cabinet having a hingedly mounted front cover movable between open and closed positions, a horizontally extending rack mounted in the cabinet and having a plurality of vertically extending openings through which supply and outlet lines extend, pipe unions of greater lateral extent than the openings in the rack mounted on the outlet lines above the rack and serving to retain the outlet lines in the rack, a manifold positioned above the unions, an electrically actuated master valve connected to the supply line, a pipe union connected to the master valve permitting disconnection of the system from the supply line, an anti-siphon valve connected between the master valve and the manifold, electrically actuated control valves connected between the manifold and the unions on the outlet lines, and a clock timer mounted in the cabinet and connected to the master valve and the control valves for actuating said valves.

2. The system of claim 1 wherein the clock timer is connected to the valves in such manner that the master valve is open only when one of the control valves is open, and pressure is removed from the anti-siphon valve when all of the control valves are closed.

* * * * *